Feb. 27, 1940. E. F. GEHRET 2,192,008
MANUFACTURE OF PROPELLER BLADES
Filed May 26, 1938 2 Sheets-Sheet 1
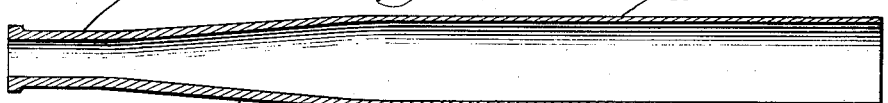
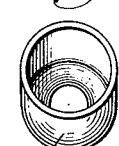
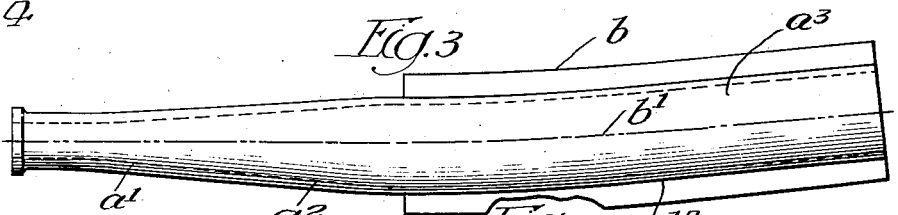
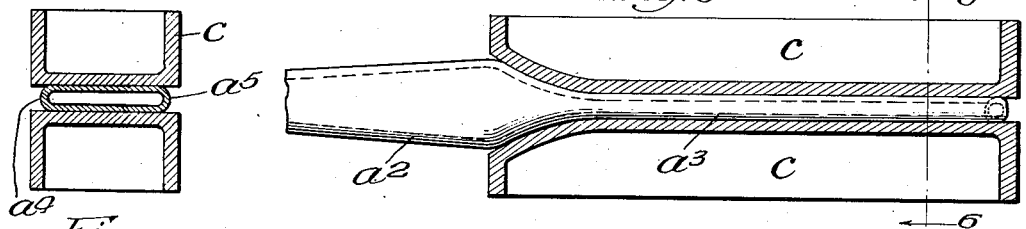
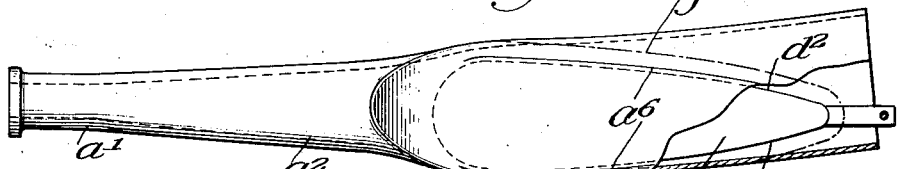
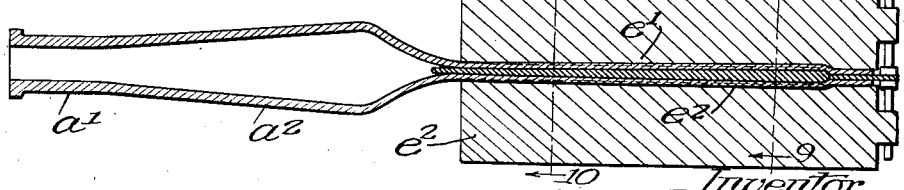
Inventor
Edward F. Gehret
By Fred Gerlach Attys Feb. 27, 1940.    E. F. GEHRET    2,192,008
MANUFACTURE OF PROPELLER BLADES
Filed May 26, 1938    2 Sheets-Sheet 2
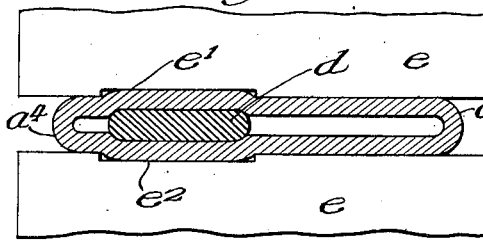
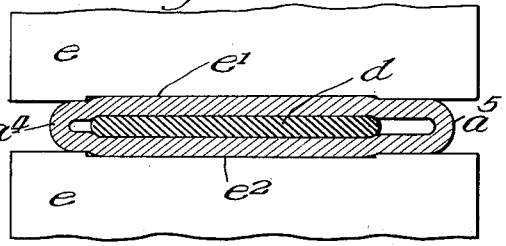
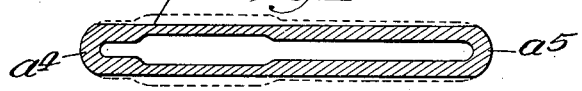
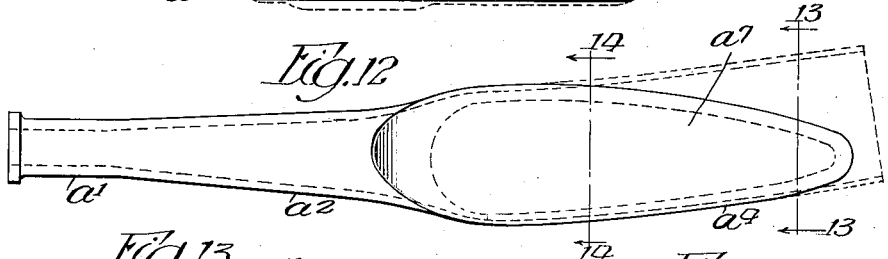
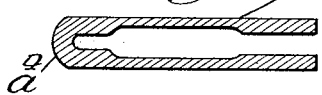
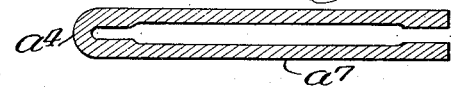
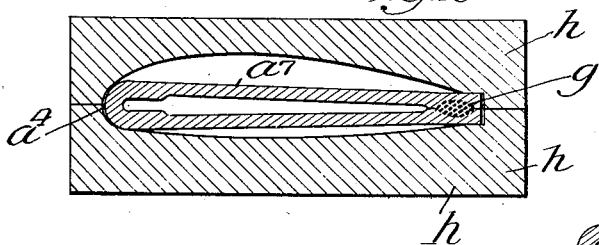
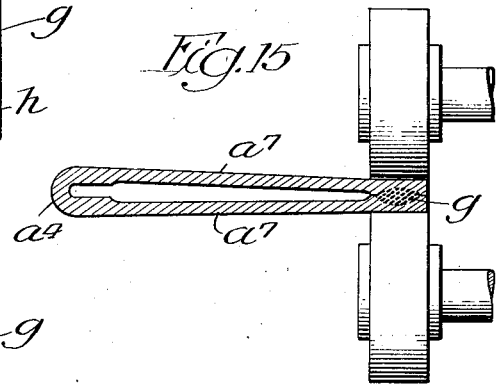
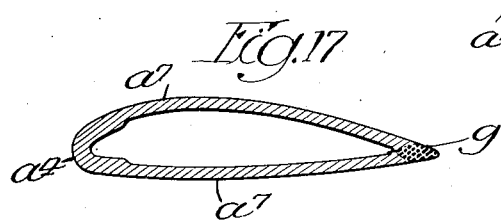
Inventor
Edward F. Gehret
By Fred Gerlach
his Atty.

Patented Feb. 27, 1940

2,192,008

UNITED STATES PATENT OFFICE 2,192,008

MANUFACTURE OF PROPELLER BLADES

Edward Fayette Gehret, Jersey Shore, Pa., assignor to Aviation Manufacturing Corporation, Williamsport, Pa., a corporation of Delaware Application May 26, 1938, Serial No. 210,126

10 Claims. (Cl. 29—156.8)

The invention relates to the manufacture of hollow steel propeller blades for airplanes.

In practice, it has been found that when a hollow steel blade is formed from a straight cylindrical blank with a seamless leading edge which is straight and parallel to the axis of the blank throughout its working length, and the curved trailing edge is formed by welding face-sections together, the planform is such that the blade is aerodynamically inefficient and unstable due to the fact that the center of air pressure at substantially all cross-sections is not coincident with the longitudinal axis of the blade.

The present invention contemplates fabricating a hollow steel propeller blade from a seamless metal blank, bending the tubular portion used for forming the faces longitudinally, flattening the blank in a plane substantially parallel to the plane of the bend, and forming a longitudinally curved seamless leading edge, and a trailing edge and tip by trimming and welding the blank. This makes it possible to provide any desired contour at the leading and trailing edges so that the air-loading in flight will produce substantially no twisting or result in instability of "flutter", and to locate the center of air pressure at all cross-sections of the blade substantially coincident with the longitudinal center of the blade, so that the blade will have maximum aerodynamic efficiency.

One object of the invention is to provide a method of making a hollow steel propeller blade from a seamless tubular blank and forming the blade with a curved seamless leading edge and a trailing edge by joining marginal portions of the faces so the blade will be aerodynamically efficient.

Another object of the invention is to provide an improved method of forming a hollow steel propeller blade from a seamless tubular blank which comprises a seamless leading edge having a greater wall-thickness than the medial portions of the faces and a trailing edge formed by joining together face-portions.

Another object of the invention is to provide a hollow steel propeller blade with a curved seamless leading edge, and a trailing edge and tip formed by a weld between the inner faces of the sections, and which is aerodynamically efficient and stable.

Another object of the invention is to provide a hollow steel propeller blade having a seamless leading edge between its faces, and a trailing edge and tip formed by a weld between the face-sections, the proportions being of such contour that twisting or "flutter" will be prevented, the center of pressure of each section being coincident with the axis of the blade at substantially all cross-sections.

Another object of the invention is to provide a hollow steel propeller blade, having integral shank and face-portions, a seamless leading edge, a trailing edge formed by joining the face-sections, the wall-thickness at the leading edge being greater than the wall-thickness at the trailing edge, and wall-thickness in the face-portions extending chordwise between the edges, less than that at both edges.

Other objects of the invention will appear from the detailed description.

The invention consists in the several novel features which are hereinafter set forth and are more particularly defined by claims at the conclusion hereof.

In the drawings: Fig. 1 is a plan of the tubular blank from which the blade is made. Fig. 2 is a section of the blank after it has been swaged and upset to form a shank on the blank. Fig. 3 is a plan illustrating the bending of the portion of the swaged blank which is used for forming the foils so as to provide a contour along one side thereof which conforms to the desired contour of the leading edge while said portion of the blank remains tubular and so that the blank may be folded upon itself along that line to form a seamless leading edge. Fig. 4 is an outer end view of the bent blank shown in Fig. 3. Fig. 5 is a longitudinal section illustrating the manner of flattening the tubular blank after it has been bent as aforesaid. Fig. 6 is a section on line 6—6 of Fig. 5. Fig. 7 is a plan illustrating the blank after it has been flattened and after the face sections have been embossed to form integral raised portions in said faces. Fig. 8 is a vertical longitudinal section illustrating the manner of embossing the face sections between dies to form raised portions on the faces. Fig. 9 is a section on line 9—9 of Fig. 7. Fig. 10 is a section on line 10—10 of Fig. 8. Fig. 11 is a section of the blank after the outer faces of the face sections have been milled off to provide reduced wall-thickness in the central portions of the face sections and greater thickness at the seamless leading edge and the trailing edge. Fig. 12 is a plan of the blank after it has been trimmed to the contour desired for the trailing edge and tip. Fig. 13 is a section on line 13—13 of Fig. 12. Fig. 14 is a section on line 14—14 of Fig. 12. Fig. 15 is a view illustrating the manner of welding together the separate face-sections to form the trailing edge of the blade and tip. Fig. 16 is a section illustrating the dies in which the face-sections are expanded to form the camber and suction members of the blade. Fig. 17 is a transverse section of the finished blade.

In carrying out the invention, a seamless tubular blank $a$ of mild carbon steel and of uniform diameter, after its interior has been polished and its exterior turned to size, as shown in Fig. 1, is swaged and upset in axial direction adjacent one of its ends to provide a shank $a^1$ of increased wall-thickness and decreased exterior diameter, for attachment to a propeller hub, and a portion $a^2$ of gradually increasing diameter and decreasing wall-thickness, as shown in Fig. 2, the outer portion $a^3$ being left unchanged in diameter and wall-thickness.

Next, the blank is heated and the tubular portion $a^3$ is bent between suitable dies $b$, so that it will be curved, as at $b^4$, and its axis will be curved, as indicated by the line $b^1$. The bend is made on a suitable radius so that the side having the greater radius will be curved substantially to the desired contour of the leading edge of the blade. The bending of the tubular portion $a^3$ in this manner is of importance in forming a seamless leading edge for the blade or without interruption or cutting of the wall of the blank and in providing a contour of the leading edge which is aerodynamically efficient.

After the blank has been bent, as shown in Fig. 3, the tubular portion $a^3$ is heated and flattened between dies $c$, as illustrated in Figs. 5 and 6. This flattening is done by pressure perpendicular to the plane of the bend to shape the bent tubular portion $a^3$ into flat faces which are substantially parallel to the plane in which the portion $b^4$ has been bent, and are joined together by semicircular curves $a^4$, $a^5$. The curved connecting portion $a^4$ between the faces will correspond in curvature on the arc of greater diameter formed during the bending operation illustrated in Fig. 3, and will conform to the desired leading edge contour. The connecting bend $a^5$ at the other side of the flattened blank will be disposed at the curved portion of the blank bent on the lesser radius. The contour of the latter portion is unimportant because it is subsequently cut away in forming the trailing edge of the blade.

Next, a former $d$ is inserted into the flattened blank through its outer end for embossing the flattened faces of the blank. The blank with the former therein is then placed between dies $e$ which have mating cavities $e^1$, $e^2$ conforming in contour to the former $d$. The side edge $d^1$ of this former conforms approximately to the contour of the folded edge $a^4$ of the blank used for forming the leading edge of the blade to a point adjacent the outer end of the blank and its other side edge $d^2$ is disposed inwardly of the fold $a^5$ at the other side of the blank.

The cavities $e^1$, $e^2$ in the dies conform to the contour of the former $d$ and are adapted to emboss the faces outwardly on a line slightly outwardly of, and conforming to, the contour of the former. When the dies are brought together, the face-portions surrounding the former will be forced closely together and form raised or embossed portions on each of the faces on the line indicated at $a^6$. The embossed portion adjacent the curved bend $a^4$ will be substantially parallel to the fold $a^4$ which is used in forming the leading edge and will diverge away from said fold in close proximity to the tip of the former $d$. The former $d$ tapers in thickness from its tip-end and the die cavities are correspondingly tapered so that the embossed portions of the faces of the blank will diverge slightly from their inner ends toward their outer ends.

The bottom of each of the die cavities $e^1$, $e^2$ are parallel to the faces of former $d$ and are of slightly greater depth adjacent the fold $a^4$ of the blank than at the opposite edges, so that when the dies are brought together the face-portions of dies $e$ will force the portions of the blank adjacent the fold $a^4$ somewhat closer together than the portions of the die-faces at the opposite edge will force together the portions of the blank adjacent the fold $a^5$, for a purpose presently to be described.

Next, the blade with the former therein is placed in a slab-milling machine and the face-sections are planed or cut off in parallel transverse planes and sufficiently to remove the embossed portions on the faces and to produce straight outer surfaces on the faces of the blade, as illustrated in Figs. 11 and 12. By reason of bending the portions adjacent the fold $a^4$ closer together than the portions adjacent the fold $a^5$, the milling cuts will leave practically full wall-thickness around and adjacent the portion $a^4$ which is used for forming the leading edge; the portions around and adjacent the fold $a^5$ will have a lesser wall-thickness, and the intermediate portions $a^7$ of the face-sections, where the embossed portions have been removed, will have a wall-thickness less than that adjacent both bends $a^4$, $a^5$. The thickness of the metal forming the leading and trailing edges may be varied by the depth of the milling cut as well as the heighth of the embossed portions and the relative wall thickness of the portions adjacent the bends $a^4$, $a^5$ may be varied by varying the relative depth of the bends around the embossed portions. By using a former $d$ having its thickness longitudinally tapered from its outer towards its inner end and making parallel mill cuts, the face-sections are given a gradually decreasing wall-thickness towards the tip of the blade.

This embossing and slab mill cutting results in forming the blank with a zone of maximum wall-thickness across and along the leading edge, a zone of somewhat thinner wall-thickness along the trailing edge, and zones of minimum wall-thickness intermediate the marginal portions of the faces for correct distribution of the metal for aerodynamic efficiency and lightness.

Next, the blank is cut off or sawed through both of the face-sections on the line, indicated by $f$ in Fig. 7, so that the blank will have the planform illustrated in Fig. 12. When so cut, the former $d$ will be removed. The cut extends from a point as close as possible to the tip on the leading edge around the tip and conformably to the trailing edge to the shank.

The inner faces of the face-sections along the trailing edge and around the tip are next welded together as at $g$ by resistance welding under pressure, as illustrated in Fig. 15.

Next, the blank is placed between dies $h$ which have cavities of a contour conforming to the desired shapes of camber and pressure faces of the blade. While held in dies $h$ the faces are expanded while heated, by fluid under pressure internally applied to the blank, to conform to the die cavities, so the outer surfaces of the faces will have the desired suction and pressure contour.

Next, the edges of the blade are trimmed or ground and polished, as desired, to form a smooth leading and trailing edge.

The invention exemplifies a method of making, from a seamless tubular blank, a blade with a seamless leading edge which is curved longitudinally for maximum aerodynamic efficiency.

The invention also exemplifies a blade having an integral shank and face-sections with a jointless leading edge which is curved for maximum aerodynamic efficiency and a tip and trailing edge formed by welding and in which the blades are shaped for maximum aerodynamic efficiency.

The invention also exemplifies a method of making, and a, blade with a seamless leading edge having a maximum wall-thickness, relatively lesser wall-thickness at the trailing edge and an intermediate zone of reduced wall-thickness for lightness and stability.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in making a hollow steel propeller blade from a seamless tubular blank, which comprises reducing in diameter and shaping one end portion of the blank to form a shank, bending on a curve relatively to the axis of the shank the portion of the tubular blank which is used to form the working faces, flattening the bent tubular portion of the blank in a plane substantially parallel to the plane of the bend to form faces, trimming the flattened blank through both faces approximately to trailing edge and tip contour, and leaving the faces integrally joined and longitudinally curved substantially along the entire leading edge contour to the tip, joining together the faces along the trailing edge and around the tip, and shaping the faces to pressure and suction face contour with a leading edge curved and seamless substantially along the entire length of the face and to the tip.

2. That improvement in making a hollow steel propeller blade from a seamless tubular blank, which comprises reducing in diameter and shaping one end portion of the blank to form a shank, bending on a curve relatively to the axis of the shank the portion of the tubular blank which is used to form the working faces, flattening the bent tubular portion of the blank in a plane substantially parallel to the plane of the bend to form faces, embossing the faces to raise portions thereof inwardly of, and substantially parallel to, the trailing and leading edges, slab-milling the faces to remove the embossed portions, trimming the flattened blank through both faces approximately to trailing edge and tip contour, and leaving the faces integrally joined and longitudinally curved substantially along the entire leading edge contour to the tip, joining together the faces along the trailing edge and around the tip, and shaping the faces to pressure and suction face contour with a leading edge curved and seamless substantially along the entire length of the face and to the tip.

3. That improvement in making a hollow steel propeller blade from a seamless tubular blank, which comprises reducing in diameter and shaping one end portion of the blank to form a shank, bending on a curve relatively to the axis of the shank the portion of the tubular blank which is used to form the working faces, flattening the bent tubular portion of the blank in a plane substantially parallel to the plane of the bend to form faces, embossing the faces to raise portions thereof inwardly of, and substantially parallel to, the trailing and leading edges, slab-milling the faces to remove the embossed portions and reduce the wall-thickness between the edge portions of the faces, trimming the flattened blank through both faces approximately to trailing edge and tip contour, and leaving the faces integrally joined and longitudinally curved substantially along the entire leading edge contour to the tip, joining together the faces along the trailing edge and around the tip, and shaping the faces to pressure and suction face contour with a leading edge curved and seamless substantially along the entire length of the face and to the tip.

4. That improvement in making a hollow steel propeller blade from a seamless tubular blank, which comprises shaping one end portion of the blank to reduce its diameter and form a shank, flattening the tubular portion of the other end portion of the blank to form integral faces, embossing the faces to raise portions thereof inwardly of, and substantially parallel to, the trailing and leading edges, and pressing the faces outwardly of the embossed portion and along the leading edge to bring them closer together than the face-portions adjacent the trailing edge, slab-milling the faces to remove the embossed portions and to reduce the wall-thickness of the faces adjacent the trailing edge so they will be thinner than the wall-thickness at the leading edge, trimming the flattened blank through both faces approximately to trailing edge and tip contour, and leaving the faces integrally joined substantially along the entire leading edge contour, joining together the thinner faces along the trailing edge and tip, and shaping the faces to pressure and suction face contour with the leading edge seamless and thicker than the faces adjacent the trailing edge, substantially along the entire length of the face and to the tip.

5. That improvement in making a hollow steel propeller blade from a seamless tubular blank, which comprises shaping one end portion of the blank to reduce its diameter and form a shank, flattening the tubular portion of the other end portion of the blank to form integral faces, embossing the faces to raise portions thereof inwardly of, and substantially parallel to, the trailing and leading edges, and pressing the faces outwardly of the embossed portion and along the leading edge to bring them closer together than the face-portions adjacent the trailing edge, slab-milling the faces to remove the embossed portions and to reduce the wall-thickness of the faces adjacent the trailing edge so they will be thinner than the wall-thickness at the leading edge, and to reduce the wall-thickness between the edge-portions of the faces, trimming the flattened blank through both faces approximately to trailing edge and tip contour, and leaving the faces integrally joined substantially along the entire leading edge contour, joining together the thinner faces along the trailing edge and tip, and shaping the faces to pressure and suction face contour with the leading edge seamless and thicker than the faces adjacent the trailing edge, substantially along the entire length of the face and to the tip.

6. That improvement in making a hollow steel propeller blade from a seamless tubular blank, which comprises reducing and shaping one end portion of the blank to form a shank, bending on a curve relatively to the axis of the shank the portion of the tubular blank which is used to form the working faces, flattening the bent tubular portion of the blank in a plane substantially parallel to the plane of the bend to form integral faces, embossing the faces to raise portions thereof inwardly of, and substantially parallel to, the trailing and leading edges, and pressing the faces outwardly of the embossed portion and along the leading edge to bring them closer together than the face-portions adjacent the trailing edge, slab-milling the faces to remove the embossed portions and to reduce the wall-thickness of the faces adjacent the trailing edge so they will be thinner than the wall-thickness at the leading edge, trimming the flattened blank through both faces approximately to trailing edge and tip contour and leaving the faces integrally joined and longitudinally curved substantially along the entire leading edge contour to the tip, joining together the faces along the trailing edge and around the tip, and shaping the faces to pressure and suction face contour with a curved seamless leading edge having greater wall-thickness than the walls at the trailing edge, substantially along the entire length of the face and to the tip.

7. That improvement in making a hollow steel propeller blade from a seamless tubular blank which comprises shaping one end portion of the blank to form a tubular shank, bending the other tubular end portion of the blank relatively to the axis of the shank so that one side thereof will be curved to conform substantially to the curve desired on the leading edge, flattening the tubular portion of the blank trimming the other side of the blank along a line to conform substantially to the desired curved trailing edge, uniting the face portions to form a curved trailing edge and tip, and shaping the bent portion of the blank into working faces of airfoil form integrally united along a curved leading edge.

8. That improvement in making a hollow steel propeller blade from a tubular blank which comprises shaping one end portion of the blank to form a tubular shank, bending the other end portion of the blank relatively to the axis of the shank so that one side thereof will be curved longitudinally to conform substantially to the curvature desired on the leading edge of the blade, shaping the longitudinally curved portion of the blank into airfoil faces with a seamless fold along one side forming a longitudinally curved leading edge, and trimming and uniting the face-sections along the other side to provide a longitudinally curved trailing edge on the blade.

9. That improvement in making a hollow steel propeller blade from a tubular blank which comprises shaping one end portion of the blank to form a tubular shank, bending the other end portion of the blank relatively to the axis of the shank so that one side thereof will be curved longitudinally to conform substantially to the curvature desired on the leading edge of the blade, shaping the longitudinally curved portion of the blank into airfoil faces connected by folds at its sides and one of the folds into a seamless longitudinally curved leading edge, and trimming the other fold from the faces and uniting the faces at the trimmed margin to form a longitudinally curved trailing edge.

10. That improvement in making a hollow steel propeller blade from a tubular blank which comprises shaping one end portion of the blank to form a tubular shank, bending the other end portion of the blank relatively to the axis of the shank so that one side thereof will be curved longitudinally to conform substantially to the curvature desired on the leading edge of the blade, shaping the longitudinally curved portion of the blank into airfoil faces connected by folds at its sides, and one of the folds into a seamless longitudinally curved leading edge, reducing the wall-thickness of the faces between, and so as to leave greater thickness in, the folds, and trimming the other fold from the faces and uniting the faces at the trimmed margin to form a longitudinally curved trailing edge.

EDWARD FAYETTE GEHRET.